US012681933B2

(12) United States Patent
Ketharaju et al.

(10) Patent No.: US 12,681,933 B2
(45) Date of Patent: Jul. 14, 2026

(54) SYSTEMS AND METHODS FOR DYNAMIC QUERY OPTIMIZATION

(71) Applicant: Wells Fargo Bank, N.A., San Francisco, CA (US)

(72) Inventors: Rameshchandra Bhaskar Ketharaju, Hyderabad (IN); Lakshminarayana Jampu, Andhra Pradesh (IN)

(73) Assignee: Well Fargo Bank, N.A., San Francisco, CA (US)

( * ) Notice: Subject to any disclaimer, the term of this patent is extended or adjusted under 35 U.S.C. 154(b) by 22 days.

(21) Appl. No.: 18/504,897

(22) Filed: Nov. 8, 2023

(65) Prior Publication Data

US 2025/0147961 A1     May 8, 2025

(51) Int. Cl.
  *G06F 16/2453* (2019.01)
  *G06F 11/34* (2006.01)

(52) U.S. Cl.
  CPC .... *G06F 16/24544* (2019.01); *G06F 11/3419* (2013.01); *G06F 16/24539* (2019.01)

(58) Field of Classification Search
  CPC ......... G06F 16/24544; G06F 16/24539; G06F 11/3419
  See application file for complete search history.

(56) References Cited

U.S. PATENT DOCUMENTS

| | | | |
|---|---|---|---|
| 7,917,498 B2 | 3/2011 | Day et al. | |
| 10,346,404 B2 * | 7/2019 | Arndt ................. | G06F 16/2255 |
| 2010/0191720 A1 * | 7/2010 | Al-Omari ......... | G06F 16/24542 707/718 |
| 2021/0342350 A1 * | 11/2021 | Sirin ................... | G06F 16/9024 |
| 2021/0390099 A1 * | 12/2021 | Rahmfeld ............. | G06F 16/213 |
| 2022/0365933 A1 | 11/2022 | Li et al. | |
| 2023/0306061 A1 * | 9/2023 | Bui ....................... | G06F 16/242 |
| 2024/0168948 A1 * | 5/2024 | Zhu ..................... | G06F 11/3457 |

(Continued)

OTHER PUBLICATIONS

Uri et al. et al. "Code2Seq: Generating Sequences from Structured Representations of Code.", 2019 teaches in Abstract, "the ability to generate natural language sequences from source code snippets". (Year: 2019).*

(Continued)

*Primary Examiner* — Matthew J Ellis
(74) *Attorney, Agent, or Firm* — K&L Gates LLP

(57)     ABSTRACT

Systems, apparatuses, methods, and computer program products are disclosed for dynamic query optimization. An example method includes receiving, by communications hardware, a first query and determining, by a query analysis engine, whether the first query corresponds to a stored query of a historical query repository. The method also includes determining, in response to determining that the first query does not correspond to the stored query, determining, by the query analysis engine, a parameter set indicating a current state associated with a system involved in an execution of the first query, processing, by a reinforcement learning engine, the first query and the parameter set in accordance with a plurality of policies, selecting, by the reinforcement learning engine and based on the processing, a first policy from the plurality of policies, and generating, by the reinforcement learning engine and based on the first policy, a query execution plan for the first query.

20 Claims, 7 Drawing Sheets

(56) References Cited

U.S. PATENT DOCUMENTS

2024/0427768 A1* 12/2024 Kamali ............ G06F 16/24544

OTHER PUBLICATIONS

Uri et al. et al. "Code2Seq: Generating Sequences from Structured Representations of Code.", https://arxiv.org/pdf/1808.01400, 2019 (Year: 2019).*

Yu et al. "Reinforcement Learning with Tree—LSTM for Join Order Selection."

* cited by examiner

Reinforcement Learning (RL) Engine 312

Intelligent Agent Circuitry 314

Policy Circuitry 316

FIG. 3B

Example Implementation of Operation 408

From 406

Execute the first query in accordance with at least one policy of the plurality of policies and the parameter set
502

Determine, based on the execution, an execution metric set comprising one or more metrics captured from the execution of the first query
504

To 410

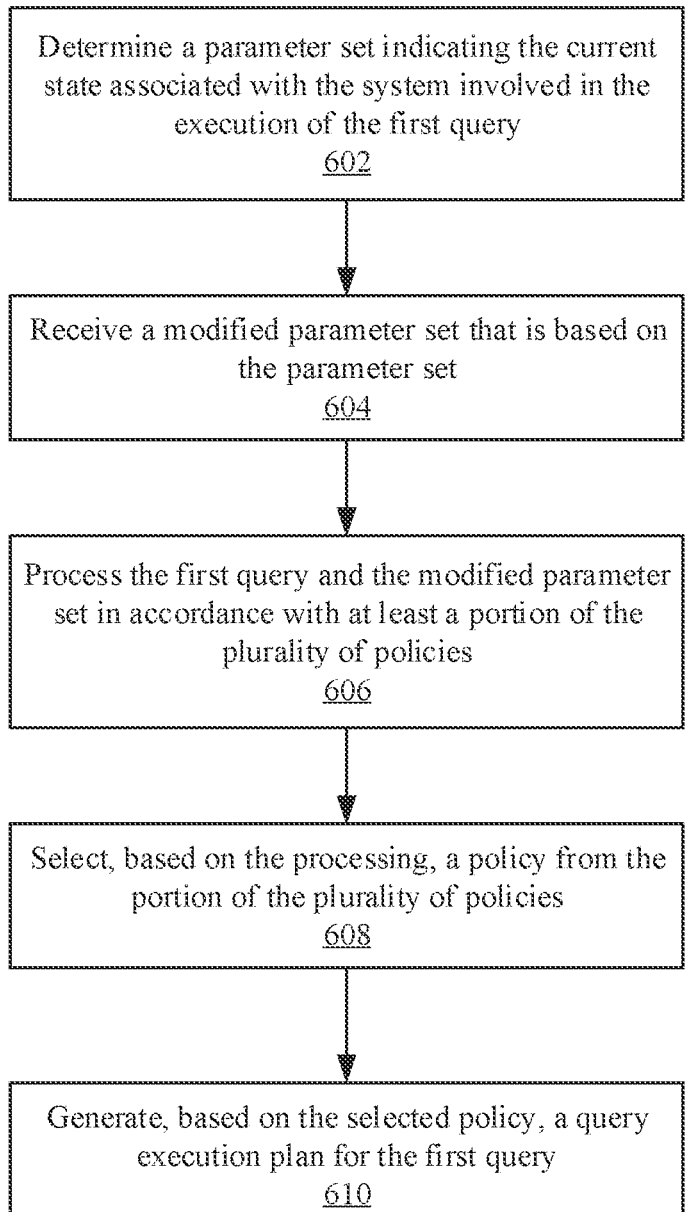

Determine a parameter set indicating the current
state associated with the system involved in the
execution of the first query
602

Receive a modified parameter set that is based on
the parameter set
604

Process the first query and the modified parameter
set in accordance with at least a portion of the
plurality of policies
606

Select, based on the processing, a policy from the
portion of the plurality of policies
608

Generate, based on the selected policy, a query
execution plan for the first query
610

FIG. 6

SYSTEMS AND METHODS FOR DYNAMIC QUERY OPTIMIZATION

BACKGROUND

In distributed file systems, queries that include join clauses may be used access data from multiple tables based on logical relationships between the tables. Executing queries that include join clauses can be computationally expensive, especially when dealing with large datasets and/or data stored across multiple nodes.

BRIEF SUMMARY

A join clause can be a complex function and often requires special attention in order to obtain acceptable computational performance. Join optimization techniques aim to minimize the time and resources required to execute queries containing join clauses while still producing accurate results. A join optimizer may be used to determine the most efficient way to execute a query involving multiple tables and joins. When a query is submitted (e.g., to a database management system), the query can be executed in various ways, using different algorithms, access paths, and the like. The role of a join optimizer is to analyze the query and a database schema and then generate an execution plan that minimizes the query's execution time and resource usage.

In the context of a distributed file system (DFS), join optimization is important for several reasons. As noted above, executing queries containing complex join clauses can monopolize computational resources, and join optimization helps ensure that data exchange and processing across disparate nodes are efficient and thus minimize the overall time taken to perform a join. Join optimization can also minimize the amount of data needed to transferred between nodes in a DFS for a join operation, thereby reducing strain on network bandwidth and helping to prevent network congestion. Join optimization also helps ensure that even in the event of node failures or network issues, a DFS can still perform joins efficiently, which is vital for maintaining uninterrupted service and data consistency. Further, join optimization enables a DFS to scale effectively. For instance, as an amount of data increases and more nodes are added to a DFS, join optimization helps ensure that the system can handle the increased workload without a significant performance degradation.

While database management and distributed file systems employ sophisticated join optimization techniques, these techniques exhibit limitations and challenges that can impact performance. For instance, since data distribution and/or characteristics of a DFS are dynamic and commonly change over time, statistical information used by a join optimizer may become outdated, which can lead to suboptimal query execution plans stemming from cost estimations which are based on inaccurate data. Additionally, traditional join optimizers are unable to capture complex relationships between data table and query characteristics when making optimization decisions, due to limiting configurations (e.g., rules-based configurations and the like).

In contrast to conventional techniques for join optimization, example embodiments described herein address technical deficiencies of join optimizers, particularly in the context of distributed file systems, by providing a dynamic query optimizer system that includes both a transfer learning (TL) engine and a reinforcement learning (RL) engine. In various embodiments, the dynamic query optimizer system intakes and processes critical characteristics and factors that conventional join optimizers do not, thus enabling a more robust and efficient join optimization process not seen in conventional implementations. In various embodiments, the dynamic query optimizer system learns from historical query execution data and patterns and predicts and optimal join order, join algorithm, and join type for new queries. In various embodiments, the dynamic query optimizer system may factor various parameters such as the size of the tables being used, a distribution of the data, access patterns of the data, query workload, and hardware configurations and the complex relationships between these factors in determining an optimal query execution plan for a given query.

The present disclosure sets forth systems, methods, and apparatuses that provide dynamic query optimization that improves upon existing query optimization techniques (such as join optimization techniques). There are many advantages of these and other embodiments described herein. For instance, the dynamic query optimizer system reduces optimization overhead by reusing existing query execution plans, and can effectively adapt to change in workloads, data characteristics, and query patterns through continuous learning of the RL engine. In addition, the dynamic query optimizer system eliminates the need for manual tuning of database configurations, thereby reducing cognitive burden on administrators along with the potential for human error and allowing for more efficient usage of resources (e.g., both computational resources and manpower). Further, the dynamic query optimizer system is configured to integrate seamlessly with multiple different DFS architectures, allowing for scalability and improved efficiency of query executions across various types of DFS and database management systems.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 3B illustrates a schematic block diagram of example circuitry associated with a reinforcement learning (RL) engine that may perform various operations in accordance with some example embodiments described herein.

FIG. 6 illustrates an example flowchart including operations performed in response to a partial match between a query and a stored query, in accordance with some example embodiments described herein.

DETAILED DESCRIPTION

Figure 1:
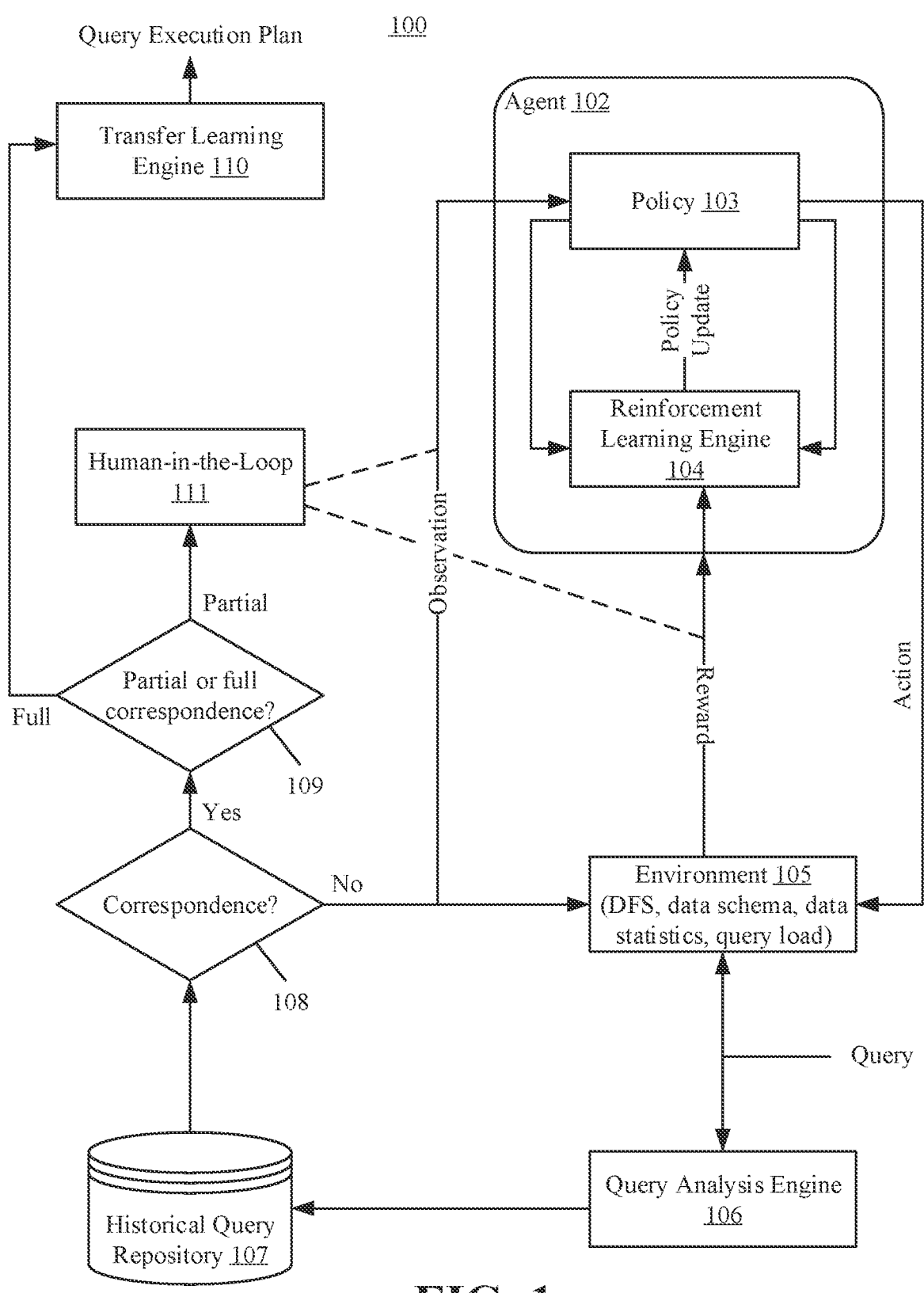
FIG. 1 illustrates an example overview of a dynamic query optimizer system and operations that may be performed by the dynamic query optimizer system in accordance with some example embodiments described herein.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "join" (or "join operation" or "join clause") refers to an operation in a relational system that associates rows in two or more tables via one or more common values in specified columns. There are various types of joins, such as inner joins, left joins, right joins, outer joins, and others.

The term "relational database" refers to a database whose data is stored in two-dimensional tables (also called relations), with each table having a single theme, and where the data in multiple tables is accessed in a coordinated manner based on the relationships among the tables.

The term "distributed file system (DFS)" refers to a file system that manages directories and files on multiple computers in a distributed computing environment. The distributed computing environment may be characterized by decentralized computers, processing, data, control, and support. In a distributed computing environment, processing may be performed by two or more computers or clusters of computers that are geographically dispersed. A DFS may comprise data management software that is used to manage massive amounts of structured and unstructured data distributed across hundreds or thousands of servers. In addition to enabling distributed data to be managed, a DFS also enables the processing of the data to be distributed. For instance, central processing units (CPUs) in the multiple servers among which data is distributed may all process the data concurrently rather than funneling the data to one server for processing, and this parallel processing speeds up throughput significantly.

Overview

Turning first to FIG. 1, an example representation 100 of a dynamic query optimizer system and operations that may be performed by the dynamic query optimizer system is shown. In various embodiments, the dynamic query optimizer system may utilize a policies 103 that define a set of rules used to select a query execution plan (e.g., that includes a combination of a join algorithm, a join order, and a join type) based on a current state of an environment 105 (e.g., a system which may include various devices, repositories, and the like that are involved in executing queries). In various embodiments and as discussed further herein, a policies 103 may be learned by the dynamic query optimizer system through trial-and-error using reinforcement learning (RL) techniques. In other words, in the context of reinforcement learning, a policy may comprise a strategy that an agent 102 (e.g., a computer program that performs actions continuously and/or autonomously in connection with an RL engine 104) uses in pursuit of goals, and the policy dictates actions that the agent takes as a function of the agent's state and the state of the environment.

In various embodiments, as shown for example in FIG. 1, a query (which may include one or more join clauses for joining two tables (e.g., according to a first policy)) is provided to a query analysis engine 106, which may in turn generate a parameter set (i.e., an "observation") based on the query. In various embodiments and as detailed further herein, the parameter set may provide detail as to current hardware configurations of various devices in an environment, currently available resources in the environment, current query load (e.g., a number of queries being executed or queued to be executed on a system at a given time), join table statistics, table characteristic data (e.g., table size, complexity, cardinality, distribution, density, variability, and velocity), and query characteristic data (e.g., join conditions, selectivity of join conditions, etc.), as discussed further herein. In various embodiments, as shown in FIG. 1, the query is processed using a historical query repository 107 storing previously executed queries and these stored queries may be compared to the query to determine (e.g., at decision point 108) a whether a correspondence (e.g., a full or partial match between the query and one or more of the stored queries) exists. In some embodiments, if no correspondence exists, the dynamic query optimizer system may, through a reinforcement learning (RL) engine 104, iteratively execute the query using different policies (i.e., "actions"), identify the most optimal policy for the query based on results of these executions, and generate a new query execution plan based on the most optimal policy (e.g., the most optimal combination of a join algorithm, a join order, and a join type) for the query.

In various embodiments, after executing the query with a given query execution plan (according to a policy), feedback (i.e., a "reward") is provided to the RL engine 104 which includes the most optimal execution plan based on execution time and/or resource utilization (e.g., memory and disk input/output (I/O)) metrics, and/or other metrics. In various embodiments, in cases where there is a full (e.g., 100%) match between the query and a stored query in the historical query repository (e.g., shown by decision point 109), the dynamic join optimizer system may leverage a transfer learning (TL) engine 110 to determine and provide a most optimal query execution plan for the query (e.g., based on a historical query execution plan for the stored query). In some embodiments, as further discussed herein, in instances in which the historical query repository contains a stored query that is at least partially related (e.g., a partial match), a human-in-the-loop component 111 may be utilized for further assessment of the query.

System Architecture

Figure 2:
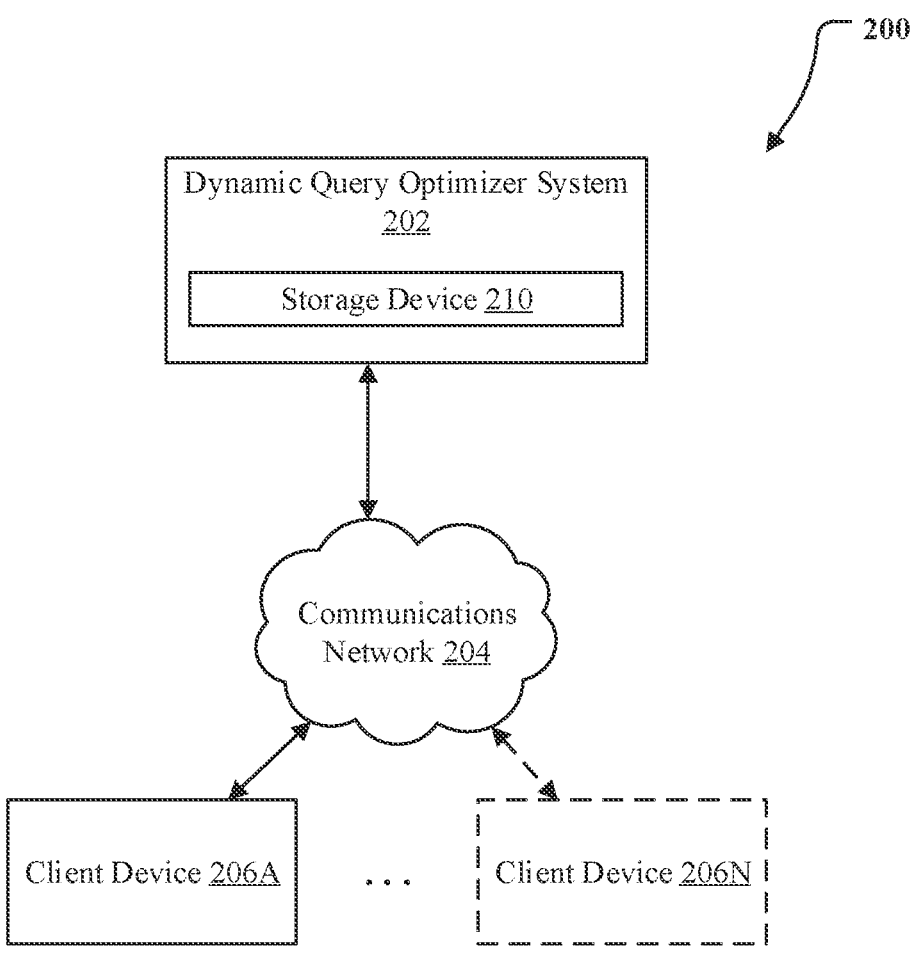
FIG. 2 illustrates a system in which some example embodiments may be used for dynamic query optimization.

Example embodiments described herein may be implemented using any of a variety of computing devices or servers. To this end, FIG. 2 illustrates an example environment 200 within which various embodiments may operate. As illustrated, a dynamic query optimizer system 202 may receive and/or transmit information via communications network 204 (e.g., the Internet) with any number of other devices, such as one or more of client devices 206A-206N.

The dynamic query optimizer system 202 may be implemented as one or more computing devices or servers, which may be composed of a series of components. Particular components of the dynamic query optimizer system 202 are described in greater detail below with reference to apparatus 300 in connection with FIG. 3.

In some embodiments, the dynamic query optimizer system 202 further includes a storage device 210 that comprises a distinct component from other components of the dynamic query optimizer system 202. Storage device 210 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 204). Storage device 210 may host the software executed to operate the dynamic query optimizer system 202. Storage device 210 may store information relied upon during operation of the dynamic query optimizer system 202, such as stored queries (e.g., previously executed queries, thus storage device 210 may serve as a historical query repository) that may be used by the dynamic query optimizer system 202, data (e.g., policy data) and documents to be analyzed using the dynamic query optimizer system 202, or the like. In addition, storage device 210 may store control signals, device characteristics, and access credentials enabling interaction between the dynamic query optimizer system 202 and one or more of the client devices 206A-206N.

The one or more client devices 206A-206N may be embodied by any computing devices known in the art. The one or more client devices 206A-206N need not themselves be independent devices, but may be peripheral devices communicatively coupled to other computing devices.

Although FIG. 2 illustrates an environment and implementation in which the dynamic query optimizer system 202 interacts indirectly with a user via one or more of client devices 206A-206N, in some embodiments users may directly interact with the dynamic query optimizer system 202 (e.g., via communications hardware of the dynamic query optimizer system 202), in which case a separate client device 206A-206N may not be utilized. Whether by way of direct interaction or indirect interaction via another device, a user may communicate with, operate, control, modify, or otherwise interact with the dynamic query optimizer system 202 to perform the various functions and achieve the various benefits described herein.

Example Implementing Apparatuses

Figure 3A:
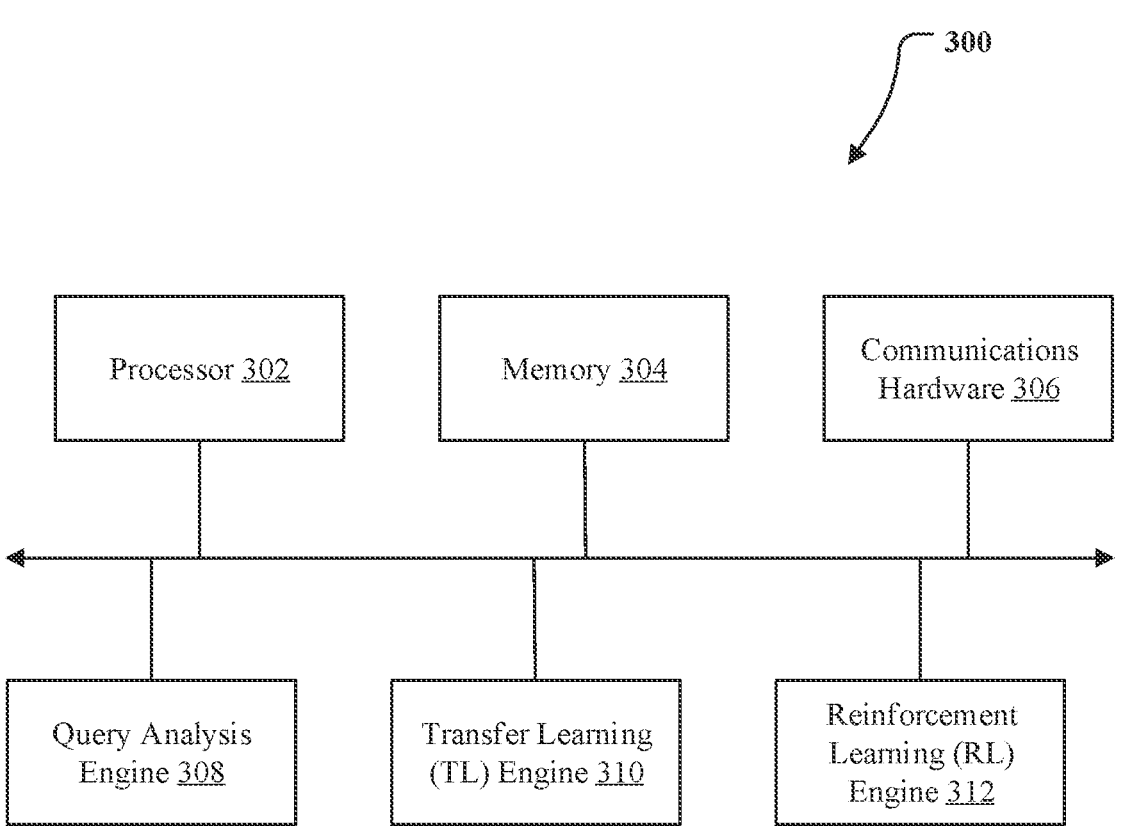
FIG. 3A illustrates a schematic block diagram of example circuitry embodying a system device that may perform various operations in accordance with some example embodiments described herein.
Figure 3B:
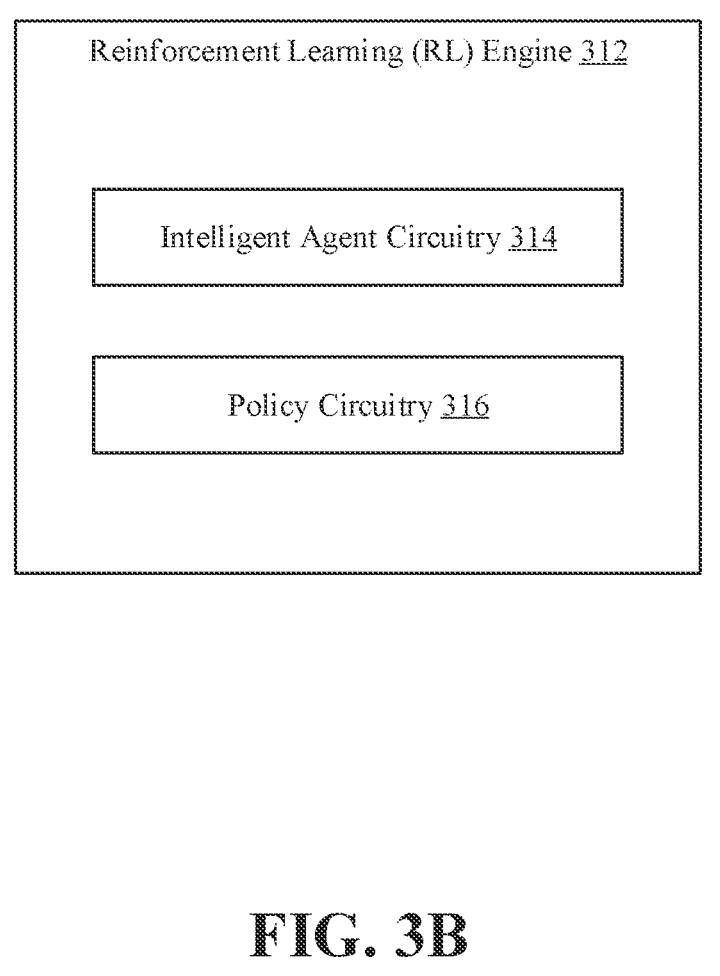

The dynamic query optimizer system 202 (described previously with reference to FIG. 2) may be embodied by one or more computing devices or servers, shown as apparatus 300 in FIG. 3A. The apparatus 300 may be configured to execute various operations described above in connection with FIGS. 1 and 2 and below in connection with FIGS. 4-6. As illustrated in FIG. 3A, the apparatus 300 may include processor 302, memory 304, communications hardware 306, a query analysis engine 308, a transfer learning (TL) engine 310, and a reinforcement learning engine 312, which, as shown in FIG. 3B, may include intelligent agent circuitry 314, and policy circuitry 316, each of which will be described in greater detail below.

The processor 302 (and/or co-processor or any other processor assisting or otherwise associated with the processor) may be in communication with the memory 304 via a bus for passing information amongst components of the apparatus. The processor 302 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 300, remote or "cloud" processors, or any combination thereof.

The processor 302 may be configured to execute software instructions stored in the memory 304 or otherwise accessible to the processor. In some cases, the processor may be configured to execute hard-coded functionality. As such, whether configured by hardware or software methods, or by a combination of hardware with software, the processor 302 represent an entity (e.g., physically embodied in circuitry) capable of performing operations according to various embodiments of the present invention while configured accordingly. Alternatively, as another example, when the processor 302 is embodied as an executor of software instructions, the software instructions may specifically configure the processor 302 to perform the algorithms and/or operations described herein when the software instructions are executed.

Memory 304 is non-transitory and may include, for example, one or more volatile and/or non-volatile memories. In other words, for example, the memory 304 may be an electronic storage device (e.g., a computer readable storage medium). The memory 304 may be configured to store information, data, content, applications, software instructions, or the like, for enabling the apparatus to carry out various functions in accordance with example embodiments contemplated herein.

The communications hardware 306 may be any means such as a device or circuitry embodied in either hardware or a combination of hardware and software that is configured to receive and/or transmit data from/to a network and/or any other device, circuitry, or module in communication with the apparatus 300. In this regard, the communications hardware 306 may include, for example, a network interface for enabling communications with a wired or wireless communication network. For example, the communications hardware 306 may include one or more network interface cards, antennas, buses, switches, routers, modems, and supporting hardware and/or software, or any other device suitable for enabling communications via a network. Furthermore, the communications hardware 306 may include the processing circuitry for causing transmission of such signals to a network or for handling receipt of signals received from a network.

The communications hardware 306 may further be configured to provide output to a user and, in some embodiments, to receive an indication of user input. In this regard, the communications hardware 306 may comprise a user interface, such as a display, and may further comprise the components that govern use of the user interface, such as a web browser, mobile application, dedicated client device, or the like. In some embodiments, the communications hardware 306 may include a keyboard, a mouse, a touch screen, touch areas, soft keys, a microphone, a speaker, and/or other input/output mechanisms. The communications hardware 306 may utilize the processor 302 to control one or more functions of one or more of these user interface elements through software instructions (e.g., application software and/or system software, such as firmware) stored on a memory (e.g., memory 304) accessible to the processor 302.

In addition, the apparatus 300 further comprises a query analysis engine 308 that determines whether a query corresponds to a stored query of a historical query repository. The query analysis engine 308 also determines a parameter set indicating a current state associated with a system involved in an execution of the query. The query analysis engine 308 may utilize processor 302, memory 304, storage device 210, and/or any other hardware component included in the apparatus 300 to perform these operations, as described in connection with FIGS. 4-6 below. The query analysis engine 308 may further utilize communications hardware 306 to gather data from a variety of sources (e.g., any of client devices 206A-206N and/or storage device 210, as shown in FIG. 2), and/or exchange data with a user.

In various embodiments, the query analysis engine 308 may parse a given query to determine a syntactical and/or grammatical structure for the query, and may also check for errors in the query (e.g., according to query language rules). In some embodiments, the query analysis engine 308 may also perform semantic analysis after parsing the query. The semantic analysis may comprise confirming existence of certain tables and/or columns that the query references, and also verifying that the query follows various integrity constraints (e.g., a set of rules that are used to maintain quality of information stored in a database) defined by a database schema.

In various embodiments, the query analysis engine 308, after parsing a given query, may utilizing exact text matching to determine whether the query corresponds to a stored query of a historical query repository. In this manner, the query analysis engine 308 may use the exact text of a received query to search the historical query repository (e.g., storage device 210) to determine if the text of the query matches text of a stored query. In some embodiments, the query analysis engine 308 may utilize a hashing technique to improve efficiency of the search, which is beneficial in circumstances where a large number of queries are continuously received by the dynamic query optimizer system 202. For example, the query analysis engine 308 may compute a hash of the query text and compare the hash to hashes of stored queries, which can provide more efficient lookup.

In various embodiments, the query analysis engine 308 may utilize string matching algorithms and/or search indexes to identify a partial match between a given query and one or more stored queries of a historical query repository. For example, the query analysis engine 308 may utilize substring matching techniques (e.g., algorithms such as the Knuth-Morris-Pratt (KMP) algorithm, Boyer-Moore algorithm, and/or the like) to determine whether a query fully or partially matches a stored query. In various embodiments, other techniques to identify full or partial matches between a query and stored queries may be utilized by the query analysis engine 308, such as fuzzy matching (e.g., Levenshtein distance, Jaro-Winkler distance, etc.), N-gram indexing, trigram matching, regular expressions, and/or the like.

In various embodiments, as noted above, the query analysis engine 308 may determine a parameter set indicating a current state associated with a system involved in an execution of the query. To do so, the query analysis engine 308 may reference certain stored information and/or initiate requests for information from certain devices of the system. For instance, the query analysis engine 308 may retrieve data from a database schema, such as table statistics (e.g., table size, data distribution, etc.) and index information such as index type, cardinality, and other data (further discussed herein). The query analysis engine 308 may also determine query characteristics for the parameter set based on, e.g., a parsing of the query (as discussed above) by the query analysis engine 308. For example, the query analysis engine 308 may determine various information regarding the query structure, such as a number of tables involved in the query, join conditions, selectivity of join conditions, and types of operations used in the query (e.g., JOIN, SELECT, GROUP BY, etc.), predicate information, and any aggregate or grouping operations involved in the query. The query analysis engine 308 may also leverage communications hardware 306 to request current data from various devices and receive data in response to those requests, such as current hardware configurations and current system load (e.g., current Central Processing Unit (CPU) utilization, memory utilization, input/output (I/O) operations per second, and the like). For instance, as discussed herein, high system load my influence the RL engine 312 to select query execution plans that minimize resource usage. Additionally, the query analysis engine 308 may leverage communications hardware 306 to obtain data regarding a current query load on the system, such as the number of queries being executed on the system at a given time as well as their execution times, and a number of concurrent users and/or queries accessing a database or multiple databases. For example, a high concurrency may lead RL engine 312 to select a different optimal query execution plan than it would in the event of a low concurrency.

In addition, the apparatus 300 further comprises a transfer learning engine 310 that a generates a query execution plan for the first query based at least on a previous query execution plan associated with the stored query. The transfer learning engine 310 may utilize processor 302, memory 304, storage device 210, and/or any other hardware component included in the apparatus 300 to perform operations, as described in connection with FIGS. 4-6 below. The transfer learning engine 310 may further utilize communications hardware 306 to gather data from a variety of sources (e.g., any of client devices 206A-206N and/or storage device 210, as shown in FIG. 2), and/or exchange data with a user.

In various embodiments, the transfer learning engine 310 may utilize a trained model to predict an optimal query execution plan based on similarities of a query to, for example, a stored query for which an optimal query execution plan was previously determined. This prediction, in essence, transfers knowledge gained from optimizing similar queries (e.g., via the RL engine 312 further discussed below) previously. For example, in some embodiments, the model leveraged by the transfer learning engine 310 may be trained using results (e.g., optimal query execution plans) of the RL engine 312 comprising a mapping of features of historical queries to optimal query execution plans historically determined for those queries. This mapping may be learned through patterns identified during an initial learning phase and continuously updated as more queries are processed by the dynamic query optimizer system 202. In various embodiments, rather than immediately optimizing a newly received query (e.g., using the RL engine 312), the dynamic query optimizer system 202 may first leverage the query analysis engine 308 to determine whether the query corresponds to a stored query of a historical query repository, and if the query fully corresponds to a stored query (e.g., there is a 100% match between the query and the stored query), the transfer learning engine 310 may then predict an optimal query execution plan based on a previous query execution plan associated with the stored query. Through transfer learning, the dynamic query optimizer system 202 benefits from knowledge gained from historical optimization of queries and enables more efficient optimization of new queries. For example, transfer learning is particularly beneficial in instances in which the dynamic query optimizer system 202 intakes and processes large amounts of diverse queries, and otherwise optimizing each of these queries (even repeated queries already optimized in the past) using the RL techniques may be time consuming and computationally burdensome.

Further, the apparatus 300 further comprises a reinforcement learning (RL) engine 312 that processes a query and a parameter set (and, in some embodiments, a modified parameter set) in accordance with a plurality of policies, selects, based on the processing, a first policy from the plurality of policies, and generates, based on the first policy, a query execution plan for the query. In some embodiments, to process the query, parameter set (or modified parameter set), the RL engine 312 may execute the first query in accordance with at least one policy of a plurality of policies and the parameter set (or modified parameter set) and determine, based on the execution, an execution metric set comprising one or more metrics captured from the execution of the first query. In this manner, the RL engine 312 may select the first policy (i.e., an optimal policy) based on at least one metric of the execution metric set. The RL engine 312 may utilize processor 302, memory 304, query analysis engine 308, and/or any other hardware component included in the apparatus 300 to perform these operations, as described in connection with FIGS. 4-6 below. The RL engine 312 may further utilize communications hardware 306 to gather data from a variety of sources (e.g., any of client devices 206A-206N and/or storage device 210, as shown in FIG. 2), and/or exchange data with a user.

In various embodiments, the RL engine 312 may include various circuitries for performing these and other operations, shown for example in FIG. 3B. As shown in FIG. 3B, in some embodiments, the RL engine 312 may include intelligent agent circuitry 314 and policy circuitry 316.

In some embodiments, the RL engine 312 may comprise intelligent agent circuitry 314 that performs various operations continuously and/or autonomously in connection with the RL engine 312. For example, in the context of reinforcement learning, the intelligent agent circuitry 314 may interact with and learn from an environment (e.g., one or more systems) as well as make decisions to maximize a reward signal, and may utilize advanced algorithms to optimize actions based on rewards. In some embodiments, the intelligent agent circuitry 314 may select policies (for a query to be executed in accordance with) based on a state of the environment (e.g., as indicated by a parameter set) and learned policies. In some embodiments, the intelligent agent circuitry 314 may receive rewards (e.g., execution metric sets) or other feedback from an environment based on, for example, query execution. In some embodiments, the intelligent agent circuitry 314 may utilize and train the RL engine

312 (e.g., one or more reinforcement learning models and/or algorithms utilized by the RL engine 312) to learn from a reward, such as an execution results set, and update one or more policies and/or decisional rules. The intelligent agent circuitry 314 may utilize processor 302, memory 304, RL engine 312, policy circuitry 316, and/or any other hardware component included in the apparatus 300 to perform these operations, as described in connection with FIGS. 4-6 below.

In some embodiments, the RL engine 312 may comprise policy circuitry 316 that defines rules that the intelligent agent circuitry 314 may use to select various actions based on environment states. In some embodiments, policy circuitry 316 may map particular states to particular actions (e.g., policies). In some embodiments, policy circuitry 316 may initialize policies, evaluate effectiveness of policies based on rewards, and refine policies using, e.g., RL techniques such as a value iteration algorithm or policy gradient method to enhance decision-making of the RL engine 312. The policy circuitry 316 may utilize processor 302, memory 304, RL engine 312, intelligent agent circuitry 314, and/or any other hardware component included in the apparatus 300 to perform these operations, as described in connection with FIGS. 4-6 below.

Although components 302-316 are described in part using functional language, it will be understood that the particular implementations necessarily include the use of particular hardware. It should also be understood that certain of these components 302-316 may include similar or common hardware. For example, the query analysis engine 308, TL engine 310, RL engine 312, intelligent agent circuitry 314, and policy circuitry 316 may each at times leverage use of the processor 302, memory 304, or communications hardware 306, such that duplicate hardware is not required to facilitate operation of these physical elements of the apparatus 300 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 300 to perform the various functions described herein.

Although the query analysis engine 308, TL engine 310, RL engine 312, intelligent agent circuitry 314, and policy circuitry 316 may leverage processor 302, memory 304, or communications hardware 306 as described above, it will be understood that any of the query analysis engine 308, TL engine 310, RL engine 312, intelligent agent circuitry 314, and policy circuitry 316 may include one or more dedicated processor, specially configured field programmable gate array (FPGA), or application specific interface circuit (ASIC) to perform its corresponding functions, and may accordingly leverage processor 302 executing software stored in a memory (e.g., memory 304), or communications hardware 306 for enabling any functions not performed by special-purpose hardware. In all embodiments, however, it will be understood that the query analysis engine 308, TL engine 310, RL engine 312, intelligent agent circuitry 314, and policy circuitry 316 comprise particular machinery designed for performing the functions described herein in connection with such elements of apparatus 300.

In some embodiments, various components of the apparatus 300 may be hosted remotely (e.g., by one or more cloud servers) and thus need not physically reside on the apparatus 300. For instance, some components of the apparatus 300 may not be physically proximate to the other components of apparatus 300. Similarly, some or all of the functionality described herein may be provided by third party circuitry. For example, a given apparatus 300 may access one or more third party circuitries in place of local circuitries for performing certain functions.

As will be appreciated based on this disclosure, example embodiments contemplated herein may be implemented by an apparatus 300. Furthermore, some example embodiments may take the form of a computer program product comprising software instructions stored on at least one non-transitory computer-readable storage medium (e.g., memory 304). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 300 as described in FIG. 3, that loading the software instructions onto a computing device or apparatus produces a special-purpose machine comprising the means for implementing various functions described herein.

Having described specific components of example apparatus 300, example embodiments are described below in connection with a series of flowcharts.

Example Operations

Figure 4:
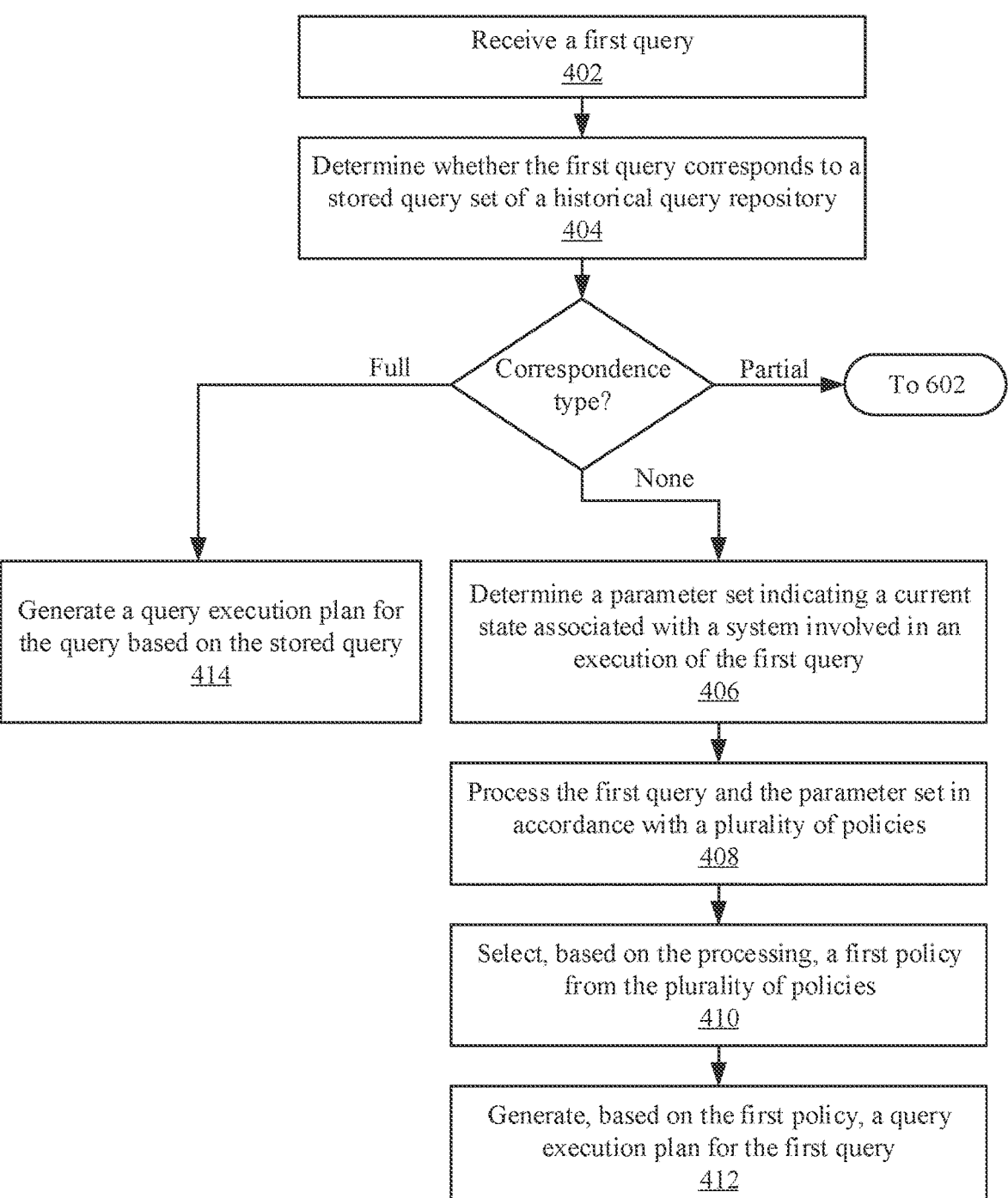
FIG. 4 illustrates an example flowchart for dynamic query optimization, in accordance with some example embodiments described herein.
Figure 5:
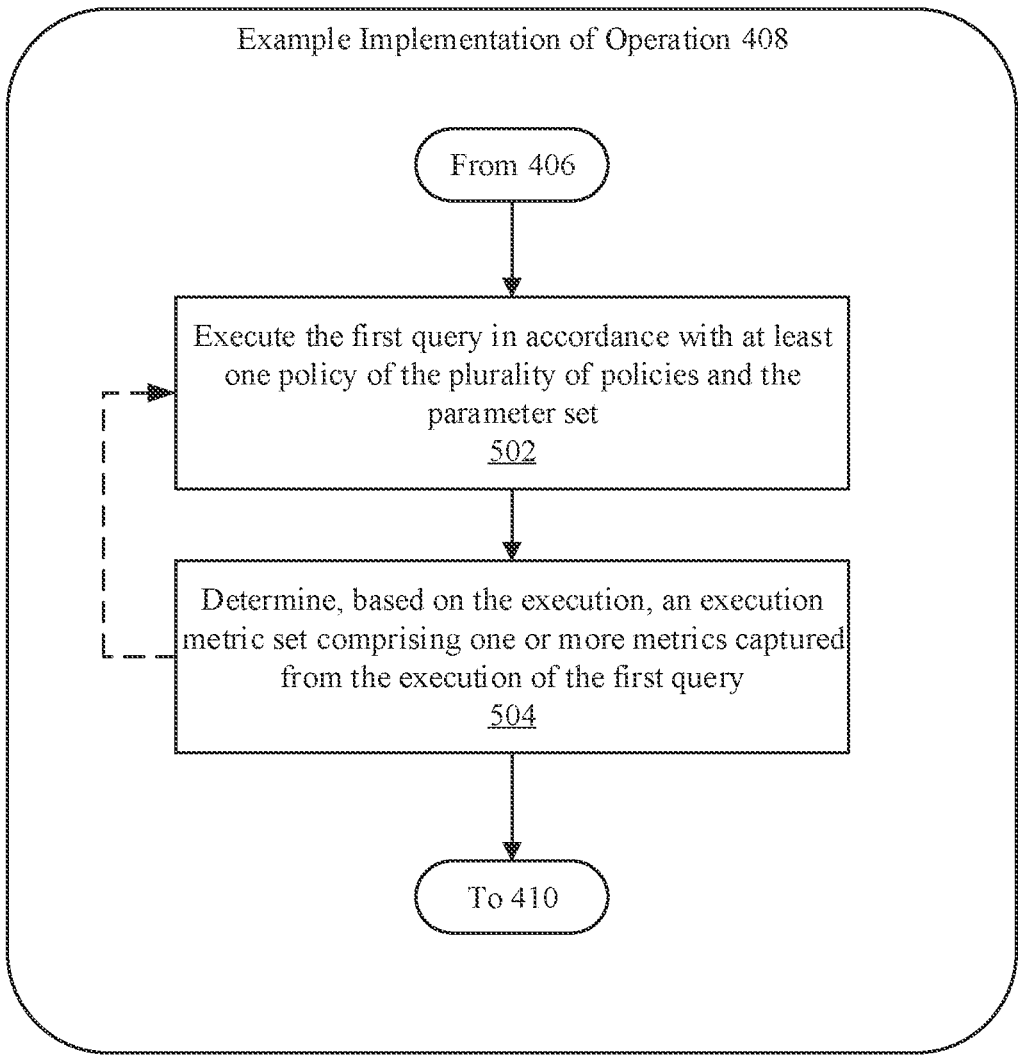
FIG. 5 illustrates an example flowchart for processing a query and parameter set in accordance with a plurality of policies, in accordance with some example embodiments described herein.

Turning to FIGS. 4-6, example flowcharts are illustrated that contain example operations implemented by example embodiments described herein. The operations illustrated in FIGS. 4-6 may, for example, be performed by a system device of the dynamic query optimizer system 202 shown in FIGS. 1 and 2, which may in turn be embodied by an apparatus 300, which is shown and described in connection with FIGS. 3A and 3B. To perform the operations described below, the apparatus 300 may utilize one or more of processor 302, memory 304, communications hardware 306, query analysis engine 308, TL engine 310, RL engine 312 (and its intelligent agent circuitry 314 and policy circuitry 316), and/or any combination thereof. It will be understood that user interaction with the dynamic query optimizer system 202 may occur directly via communications hardware 306, or may instead be facilitated by a separate client device (e.g., any of client devices 206A-206N, as shown in FIG. 2), and which may have similar or equivalent physical componentry facilitating such user interaction.

Turning first to FIG. 4, example operations are shown for dynamic query optimization.

As shown by operation 402, the apparatus 300 includes means, such as processor 302, memory 304, communications hardware 306, and/or the like, for receiving a first query. The first query may be received in various ways. For example, in some embodiments, the first query may be received through direct user input. In some embodiments, the first query may be received by the dynamic query optimizer system 202 via an interactive interface displayed at a client device 206A-206N. The interactive interface may comprise a command-line interface or graphical user interface (GUI) through which a user may input the first query. Similarly, in some embodiments, a user may enter the first query through a web form via an application or website. In some embodiments, a user may input the first query via an Application Programming Interface (API) request directly through, e.g., a programming language or a third-party API platform.

In some embodiments, the first query may be received through indirect user input. For example, the dynamic query optimizer system 202 may receive the first query from an application having generated the query via a backend translation of a user input (e.g., a more simplistic search query). In some embodiments, the application may comprise a mobile application having generated the query in response to user interactions within the mobile application. As another example, in some embodiments, the application may comprise a chatbot or similar virtual assistance application, through which a query may be generated (e.g., via Natural Language Processing (NLP)) based on questions submitted by a user. Further, in some embodiments, the first query may be received in an automated manner, such as via a scheduled job dictated by an automatic script. In this manner, certain queries may be scheduled to execute at specific times or intervals to automate certain tasks (e.g., report generation or the like) or in response to specific events in the system.

Regardless of the manner in which the first query is received, in some embodiments and as detailed above, the query analysis engine 308 may first parse the first query to determine a syntactical and/or grammatical structure for the first query, check for errors in the first query, and may also perform semantic analysis after parsing the query to confirm existence of certain tables and/or columns referenced by the first query, and also verify that the first query adheres to various integrity constraints defined by a database schema. In some embodiments, for example, if the query analysis engine 308 determines an issue with the first query (e.g., an integrity constraint violation, non-existence of certain tables and/or columns, one or more syntax errors, and/or the like), communications hardware 306 may be leveraged to communicate a response indicating the issue to an originating device of the first query, and the dynamic query optimizer system 202 will take no further action on the first query. In this manner, the dynamic query optimizer system 202 may only process queries (e.g., in accordance with an RL engine 312 or TL engine 310 as discussed below) which are error-free and adhere to all standards governing associated databases and/or the environment.

In some embodiments, the dynamic query optimizer system 202, upon receiving the first query, may determine whether the first query matches a query previously processed by the dynamic query optimizer system 202. As shown by operation 404, the apparatus 300 includes means, such as processor 302, memory 304, communications hardware 306, query analysis engine 308, and/or the like, for determining whether the first query corresponds to a stored query of a historical query repository. In various embodiments, the query analysis engine 308 may leverage communications hardware 306 to access, retrieve, or otherwise obtain stored queries from a historical query repository (e.g., storage device 210, or another remote data store). In various embodiments, the query analysis engine 308 may utilize one or more of exact text matching, hash matching, string matching algorithms and/or search indexes, substring matching techniques, fuzzy matching, N-gram indexing, trigram matching, and/or regular expressions to determine whether the query corresponds to (e.g., fully matches or partially matches) a stored query of a historical query repository.

In some embodiments, in response to determining that the first query does not correspond to any stored queries of the historical query repository (i.e., no portion of the first query is similar to any portions of the stored queries in the historical query repository), the dynamic query optimizer system 202 may then leverage an RL engine 312 to determine an optimal query execution plan for the first query. As shown in FIG. 4, in response to determining that the first query does not correspond to a stored query, the method continues to operation 406, wherein the apparatus 300 includes means, such as processor 302, memory 304, communications hardware 306 query analysis engine 308, and/or the like, for determining a parameter set indicating a current state associated with a system involved in an execution of the first query. In some embodiments, the parameter set may comprise one or more of hardware configuration data, query load data, table characteristic data, and query characteristic data.

In some embodiments, hardware configuration data may comprise data regarding underlying hardware resources available in the system. For example, hardware configuration data may indicate CPU speed (e.g., a clock speed of one or more CPU cores of one or more devices in the system), a number of CPU cores, types, sizes, and read/write speeds of storage devices available to the system such as solid state or hard disk drives, an amount of Random Access Memory (RAM) that is available, network bandwidth between nodes in the system, CPU cache sizes, Graphics Processing Unit (GPU) availability and specifications, and the like.

In some embodiments, query load data may comprise data regarding queries being processed currently by the system, as well as data regarding queries historically processed by the system and queries in queue to be processed by the system. In this regard, query load data may indicate an amount of demand placed on the system by incoming queries and queries currently undergoing execution. For example, query load data may indicate types of queries currently being processed, estimated execution times for those queries, and a number of queries in queue to be processed by the system. In some embodiments, query load data may comprise historical query performance data, such as execution times and resource usage of historically executed queries on the system. In some embodiments, query load data may indicate a volume of queries the system is processing and/or receiving within a given timeframe (e.g., queries per second or per minute), as well as the complexity of the queries. As discussed above, in some embodiments, the query analysis engine 308 may leverage communications hardware 306 to request current data from various devices and receive data in response to those requests to obtain hardware configuration data and query load data.

In some embodiments, table characteristic data may comprise data regarding one or more tables that are referenced by the first query. In some embodiments, table characteristic data may indicate a table size (e.g., a number of rows and/or columns) for each table referenced by the query, a distribution (e.g., information about the distribution of data within a table, which may indicate whether the data is skewed), a type of index for a table (e.g., hash index, bitmap index, clustered index, etc.), cardinality (e.g., a number of distinct values in a column), density (e.g., a uniqueness of data values in a column, which may be calculated as a ratio of the number of distinct values in a column of a table to the total number of rows in the table), variability (e.g., the extent to which values in a table differ or deviate from each other), velocity (e.g., the speed at which a table or database is modified (e.g., created or updated)), and complexity (e.g., a quantification of an intricacy of a table, which may be determined based on a number of columns, data types of the table, a number and types of indexes, constraints, data volume, partitioning, and data distribution). In some embodiments, to determine table characteristic data, as detailed above, the query analysis engine 308 may reference certain stored information and/or initiate requests for information from certain devices of the system. In some embodiments, the query analysis engine 308 may retrieve data from a database schema in order to determine table characteristic data.

In some embodiments, query characteristic data may comprise data regarding the first query. In some embodiments, the query analysis engine 308 may determine at least a portion of the query characteristic data based on a parsing of the query (as discussed above) by the query analysis engine 308. For example, the query analysis engine 308 may determine various information regarding the query structure, such as a number of tables referenced in the first query, relationships between the referenced tables, join conditions (e.g., equality conditions between tables), selectivity of join conditions, and types of operations used in the query (e.g., JOIN, SELECT, GROUP BY, etc.), predicate information, subqueries, derived tables, and any aggregate or grouping functions (e.g., SUM, COUNT, etc.) involved in the query. Additionally, in some embodiments, the query analysis engine 308 may leverage communications hardware 306 to request data from various devices (e.g., servers or other devices hosting databases containing tables referenced by the first query) and receive data in response to those requests to obtain table characteristic data and query characteristic data.

As shown by operation 408, the apparatus 300 includes means, such as processor 302, memory 304, communications hardware 306, query analysis engine 308, reinforcement learning engine 312, intelligent agent circuitry 314, policy circuitry 316, and/or the like, for processing the first query and the parameter set in accordance with a plurality of policies. As discussed above, in an instance in which the first query does not correspond to stored queries of the historical query repository, the dynamic query optimizer system 202 may leverage RL engine 312 to process the first query and the parameter set in accordance with a plurality of policies in order to determine an optimal query execution plan for the first query. In some embodiments, to process the query, parameter set (or modified parameter set) the RL engine 312 may execute the first query in accordance with at least one policy of a plurality of policies and the parameter set (or modified parameter set) and determine, based on the execution, an execution metric set comprising one or more metrics captured from the execution of the first query. In this manner, the RL engine 312 may select the first policy (i.e., an optimal policy) based on at least one metric of the execution metric set.

For example, upon determining the parameter set indicating one or more of hardware configuration data, query load data, table characteristic data, and query characteristic data as discussed above, the query analysis engine 308 may pass the parameter set and the first query to the reinforcement learning (RL) engine 312 for processing in order to determine an optimal query execution plan for the first query. In some embodiments, after executing the query over multiple iterations using different policies (i.e., "actions" as shown in FIG. 1), the RL engine 312 may identify the most optimal policy for the first query and generate a new query execution plan based on the most optimal policy (e.g., the most optimal combination of a join algorithm, a join order, and a join type) for the query. In various embodiments, the parameter set serves to describe the current state of the environment and thus a context in which the RL agent (e.g., intelligent agent circuitry 314) is to operate when making determinations (e.g., selecting policies and determining an optimal query execution plan).

In some embodiments, the parameter set may be prepro-cessed (e.g., by query analysis engine 308) into a suitable input format for the intelligent agent circuitry 314. In some embodiments, this preprocessing may involve performing one or more vectorization, embedding, and/or tokenization operations on the parameter set (e.g., to represent textual information numerically).

Example operations for processing the first query and the parameter set in accordance with a plurality of policies are shown in FIG. 5. As shown by operation 502, the apparatus 300 includes means, such as processor 302, memory 304, reinforcement learning engine 312, intelligent agent cir-cuitry 314, policy circuitry 316, and/or the like, for execut-ing the first query in accordance with at least one policy of the plurality of policies and the parameter set.

In various embodiments, a policy may comprise a unique combination of a join order, a join type, and a join algorithm, each of which refer to a different aspect in join optimization. In various embodiments, join order refers to a sequence in which tables are joined (e.g., based on the join operations of the first query). The order in which tables are joined may significantly impact performance of the execution of the first query. Examples of join orders include a left-deep join, a right-deep join, a bushy join, and a hybrid join. It is to be appreciated that other join orders may also be utilized by the RL engine 312.

In various embodiments, join type refers to how tables are combined when performing a join operation (e.g., of the first query). Examples of join types include a map-side join, reduce-side join, semi-join, anti-join, and Cartesian join. It is to be appreciated that other join types may also be utilized by the RL engine 312. In some embodiments, join type may impact which rows of a table are included in (or excluded from) a result set stemming from an execution of the first query.

In various embodiments, join algorithm refers to a spe-cific algorithm used to efficiently perform join operations of the first query. There are various join algorithms which may be suited to specific join conditions, data distributions, and the like. Examples of join algorithms include sort-merge join, broadcast join, hash join, and map-side join. In some embodiments, the choice of a join algorithm depends on various factors such as, for example, table size and join conditions.

In various embodiments, operation 408 may comprise iteratively executing the first query in accordance with each policy of the plurality of policies. That is, the intelligent agent circuitry 314 may leverage the policy circuitry 316 to execute the query according to each possible combination of join order, join type, and join algorithm (wherein one combination of join order, join type, and join algorithm constitutes one policy). In this regard, the RL engine 312 may modify the query according to a respective policy (e.g., changing the join order, join type, and/or join algorithm) and execute the modified query using a simulated environment (the state of which is based on the parameter set) that mimics the real-world system in which the query would actually be executed. More broadly, this reinforcement learning process allows the intelligent agent circuitry 314 to learn (from interactions with the environment) to make decisions within the environment, receive feedback in the form of rewards (e.g., execution metric sets as discussed below), and update policies based on this feedback.

In some embodiments, after each execution of the first query, an execution metric set is determined that comprises results of the execution. In this regard, as shown by opera-tion 504, the apparatus 300 includes means, such as proces-sor 302, memory 304, reinforcement learning engine 312, intelligent agent circuitry 314, policy circuitry 316, and/or the like, for determining, based on the execution, an execu-tion metric set comprising one or more metrics captured from the execution of the first query. For example, the execution metric set may serve as a "reward" (e.g., in the context of reinforcement learning and as shown in FIG. 1) to the RL engine 312. In some embodiments, the execution metric set may comprise metrics resulting from the execu-tion of the first query, such as an execution time metric and a resource utilization metric. In some embodiments, the execution time metric may indicate an execution time (e.g., an estimated execution time) needed to produce a result based on the execution of the first query in accordance with a specific policy. In some embodiments, the resource utili-zation metric may indicate an amount of computational resources used when executing the first query in accordance with a specific policy. For example, the resource utilization metric may indicate amounts of memory usage, disk input/output (I/O) usage, and/or the like. As shown in FIG. 5, operations 502 and 504 may be continuously performed for each execution of the first query (in accordance with respec-tive policies) such that multiple execution metric sets may be determined (e.g., for each policy).

Returning to FIG. 4, after processing the first query and the parameter set in accordance with the plurality of policies, a first policy may be selected that reflects a most optimal policy (i.e., a most optimal combination of join order, join type, and join algorithm) for a query execution plan. In this regard, as shown by operation 410, the apparatus 300 includes means, such as processor 302, memory 304, rein-forcement learning engine 312, intelligent agent circuitry 314, policy circuitry 316, and/or the like, for selecting, based on the processing, a first policy from the plurality of policies.

In some embodiments, the first policy may be selected based on at least one metric of an execution metric set. For example, in response to determining a plurality of execution metric sets (based on respective executions of the first query in accordance with respective policies), the RL engine 312 may select the first policy which corresponds to an execution metric set having the lowest execution time metric and/or lowest resource utilization metric of the plurality of execu-tion metric sets. In other words, the most optimal execution metric set corresponds to the most optimal policy for the first query.

As shown by operation 412, the apparatus 300 includes means, such as processor 302, memory 304, reinforcement learning engine 312, intelligent agent circuitry 314, policy circuitry 316, and/or the like, for generating, based on the first policy, a query execution plan for the first query. The query execution plan may be generated using the join order, join type, and join algorithm defined by the first policy. In some embodiments, the query execution plan comprises a sequence of steps detailing how the database engine should execute the query, including tables to be accessed, join methods to be used, as well as additional operations (e.g., filtering, sorting, or the like).

In some embodiments, once the query execution plan is generated, the first query may be executed using the query execution plan, such that a result of the query may be provided, e.g., back to a device that initially submitted the first query. In some embodiments, the first query may be executed by the dynamic query optimizer system 202 or transmitted to a separate (external) system for execution. In some embodiments, after execution of the query, the dynamic query optimizer system 202 may obtain an execution results set which indicates results of an execution of the first query in accordance with the query execution plan. In this regard, the apparatus 300 includes means, such as processor 302, memory 304, communications hardware 306, and/or the like, for receiving an execution results set, wherein the execution results set indicates results of an execution of the first query in accordance with the query execution plan. The execution results set may provide metrics such as an execution time metric and a resource utilization metric (as discussed above) based on an actual execution of the query in the system (e.g., different from the execution metric sets estimated through execution of the first query in a simulated environment). In some embodiments, the execution results set may be leveraged as additional training data for the RL engine 312 such that the RL engine 312 may be improved at estimating execution time metrics and a resource utilization metrics for future queries. In this regard, the apparatus 300 includes means, such as processor 302, memory 304, intelligent agent circuitry 314, or the like, for training the reinforcement learning engine using the execution results set.

In some embodiments, as shown in FIG. 4, in response to determining that the first query fully corresponds to a stored query of the historical query repository (i.e., first query matches a stored query in the historical query repository), the dynamic query optimizer system 202 may then leverage a transfer learning (TL) engine 310 to determine an optimal query execution plan for the first query.

As shown in FIG. 4, in response to determining that the first query fully corresponds to a stored query of the historical query repository, the method continues to operation 414, wherein the apparatus 300 includes means, such as processor 302, memory 304, transfer learning engine 310, and/or the like, for generating a query execution plan for the first query based at least on a previous query execution plan associated with the stored query.

As discussed above, the transfer learning engine 310 may utilize a trained model to predict an optimal query execution plan based on similarities of a query to, for example, a stored query for which an optimal query execution plan was previously determined (thus transferring knowledge gained from determining an optimal query execution plan for a similar query (e.g., via the RL engine 312) previously. In some embodiments, as noted above, the model leveraged by the transfer learning engine 310 may be trained using results (e.g., optimal query execution plans) of the RL engine 312 comprising a mapping of features of historical queries to optimal query execution plans historically determined for those queries, and this mapping may be continuously updated as more queries are processed by the dynamic query optimizer system 202. In this regard, the transfer learning engine 310 may predict an optimal query execution plan based on a previous query execution plan associated with the stored query and generate a query execution plan based on the predicted query execution plan. In this manner, the TL engine 310 provides improved query optimization performance by applying already learned techniques to similar queries (e.g., overhead is reduced in that both time and computational resources are preserved by not having to utilize the RL engine 312 to iterate through policies to determine an optimal query execution plan for repeated queries).

In some embodiments, as shown in FIG. 4, in response to determining that the first query partially corresponds to a stored query of the historical query repository (i.e., a portion of the first query matches a portion of a stored query in the historical query repository), dynamic query optimizer system 202 may then leverage both a human-in-the-loop and the RL engine 312 to determine an optimal query execution plan for the first query, example operations for which are shown in FIG. 6.

As shown by operation 602, the apparatus 300 includes means, the apparatus 300 includes means, such as processor 302, memory 304, communications hardware 306 query analysis engine 308, and/or the like, for determining a parameter set indicating a current state associated with a system involved in an execution of the first query. In some embodiments, as discussed above, the parameter set may comprise one or more of hardware configuration data, query load data, table characteristic data, and query characteristic data. Operation 602 may be performed in a similar manner to operation 406, as discussed above in connection with FIG. 4.

In some embodiments, a human-in-the-loop (e.g., a database administrator or an individual in a similar role) may be notified of the parameter set and the first query, e.g., through a notification to a personal computer device of the human-in-the-loop. In response, the human-in-the-loop may deliver modifications to the parameter set and/or the query based on, for example, domain expertise or the like, which may aid the RL engine 312 in making more selective determinations with respect to policy selection and/or the like.

As shown by operation 604, the apparatus 300 includes means, such as processor 302, communications hardware 306, and/or the like, for receiving a modified parameter set that is based on the parameter set. For example, the human-in-the-loop may modify the parameter set and/or query to include labeled data, such as information indicating what constitutes an optimal or non-optimal policy, given the state of the environment indicated in the parameter set. By doing so, the modifications to the parameter set provided by the human-in-the-loop may cause the RL engine 312 (e.g., intelligent agent circuitry 314) to take different actions than it otherwise would have taken when determining an optimal query execution plan based on the original parameter set. For instance, the RL engine 312 may iteratively execute the query a lesser number of times, using a lesser number of policies than it otherwise would have based on the information received via the human-in-the-loop. In this regard, in some embodiments, the modified parameter set may include evaluation of one or more of the policies defined by policy component 316, which may comprise instructions to the RL engine 312 to favor certain policies over others. As one example, the human-in-the-loop may possess the domain expertise to know not to consider policies which include a particular join algorithm, as that algorithm would not be efficient given the join operations defined by the first query. In some embodiments, a human-in-the-loop is also beneficial in handling unforeseen edge cases by providing (via a modified parameter set) instructions that guide the learning process of the RL engine 312.

As shown by operation 606, the apparatus 300 includes means, such as processor 302, memory 304, communications hardware 306, query analysis engine 308, reinforcement learning engine 312, intelligent agent circuitry 314, policy circuitry 316, and/or the like, for processing the first query and the modified parameter set in accordance with at least a portion of the plurality of policies. Operation 606 may be performed in a similar manner to operation 408, as discussed above in connection with FIG. 4 (e.g., also including operations 502 and 504 of FIG. 5). For instance, RL engine 312 may process the query and modified parameter set in order to determine an optimal query execution plan for the first query. In some embodiments, after executing the query over multiple iterations using different policies, the RL engine 312 may identify the most optimal policy for the first query and generate a new query execution plan based on the most optimal policy (e.g., the most optimal combination of a join algorithm, a join order, and a join type) for the query.

As shown by operation 608, the apparatus 300 includes means, such as processor 302, memory 304, reinforcement learning engine 312, intelligent agent circuitry 314, policy circuitry 316, and/or the like, for selecting, based on the processing, a first policy from the plurality of policies. Operation 608 may be performed in a similar manner to operation 410, as discussed above in connection with FIG. 4. For instance, the policy may be selected based on at least one metric of an execution metric set. For example, in response to determining a plurality of execution metric sets (based on respective executions of the first query in accordance with respective policies), the RL engine 312 may select a policy which corresponds to an execution metric set having the lowest execution time metric and/or lowest resource utilization metric of the plurality of execution metric sets.

As shown by operation 610, the apparatus 300 includes means, such as processor 302, memory 304, reinforcement learning engine 312, intelligent agent circuitry 314, policy circuitry 316, and/or the like, for generating, based on the selected policy, a query execution plan for the first query. Operation 610 may be performed in a similar manner to operation 412, as discussed above in connection with FIG. 4. In this regard, the query execution plan may be generated using the join order, join type, and join algorithm defined by the selected policy.

FIGS. 4, 5, and 6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Conclusion

As described above, example embodiments provide methods and apparatuses that enable dynamic and improved query optimization. Example embodiments thus provide tools that overcome the problems faced by traditional query optimization processes. For instance, the dynamic query optimizer system reduces optimization overhead by reusing existing query execution plans through a transfer learning engine, and can adapt to change in workloads data characteristics, and query patterns through an RL engine which continuously learn and adjust optimization strategies over time. Additionally, through the RL engine's ability to learn intricate patterns and optimization strategies, complex queries that may involve multiple tables, join types, and the like are more effectively handled when compared to traditional rule-based optimizers. In addition, the dynamic query optimizer system eliminates the need for manual tuning of database configurations, thereby reducing cognitive burden on administrators along with the potential for human error and allowing for more efficient usage of resources (e.g., both computational resources and manpower). Further, the dynamic query optimizer system is configured to integrate seamlessly with multiple different DFS architectures, allowing for scalability and improved efficiency of join operations across various types of DFS and database management systems. Moreover, an RL-based framework allows for human-in-the-loop integration into the query optimization process, ensuring that query execution plans align with domain-specific knowledge and other requirements.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

receiving, by communications hardware, a query;

determining, by a query analysis engine, whether the query corresponds to a stored query of a historical query repository; and in response to determining that the query does not correspond to the stored query:

determining, by the query analysis engine, a parameter set indicating a current state associated with a system involved in an execution of the query;

processing, by a reinforcement learning engine, the query and the parameter set in accordance with a plurality of policies, wherein each policy of the plurality of policies comprises a join algorithm, a join order, and a join type, and wherein processing the query and the parameter set in accordance with the plurality of policies comprises:

executing, by the reinforcement learning engine, the query in a first environment in accordance with at least one policy of the plurality of policies and the parameter set, and determining, by the reinforcement learning engine and based on the execution, an execution metric set comprising one or more metrics captured from the execution of the query in the first environment;

selecting, by the reinforcement learning engine and based on the processing, a policy from the plurality of policies, wherein the policy is selected based on a resource utilization metric of the execution metric set; and generating, by the reinforcement learning engine and based on the selected policy, a query execution plan for executing the query in a second environment, wherein the query execution plan is generated using the join algorithm, the join order, and the join type of the selected policy.

2. The method of claim 1, further comprising:

receiving, by the communications hardware, an execution results set, wherein the execution results set indicates results of an execution of the query in accordance with the query execution plan; and training, by intelligent agent circuitry, the reinforcement learning engine using the execution results set.

3. The method of claim 1, wherein the execution metric set further comprises an execution time metric.

4. The method of claim 1, wherein the parameter set comprises one or more of:

hardware configuration data;

query load data;

table characteristic data; and query characteristic data.

5. The method of claim 4, wherein the table characteristic data indicates one or more of a table size, complexity, cardinality, distribution, density, variability, and velocity of one or more tables indicated by the first query.

6. The method of claim 1, wherein the first query comprises one or more join clauses.

7. The method of claim 1, further comprising, in response to determining that the first query fully corresponds to a stored query of the historical query repository:

generating, by a transfer learning engine, a query execution plan for the first query based at least on a previous query execution plan associated with the stored query.

8. The method of claim 1, further comprising, in response to determining that the first query partially corresponds to a stored query of the historical query repository:

determining, by the query analysis engine, the parameter set indicating the current state associated with the system involved in the execution of the query;

receiving, by the communications hardware, a modified parameter set that is based on the parameter set;

processing, by the reinforcement learning engine, the query and the modified parameter set in accordance with at least a portion of the plurality of policies;

selecting, by the reinforcement learning engine and based on the processing, a policy from the portion of the plurality of policies; and generating, by the reinforcement learning engine and based on the selected policy, a query execution plan for the query.

9. An apparatus comprising:

communications hardware configured to receive a first-query;

a query analysis engine configured to:

determine whether the query corresponds to a stored query of a historical query repository, and in response to determining that the query does not correspond to the stored query, determine a parameter set indicating a current state associated with a system involved in an execution of the query; and a reinforcement learning engine configured to:

process the query and the parameter set in accordance with a plurality of policies, wherein each policy of the plurality of policies comprises a join algorithm, a join order, and a join type, and wherein processing the query and the parameter set in accordance with the plurality of policies comprises:

executing the query in a first environment in accordance with at least one policy of the plurality of policies and the parameter set, and determining, based on the execution, an execution metric set comprising one or more metrics captured from the execution of the query in the first environment;

select, based on the processing, a policy from the plurality of policies, wherein the policy is selected based on a resource utilization metric of the execution metric set, and generate, based on the selected policy, a query execution plan for executing the first query in a second environment, wherein the query execution plan is generated using the join algorithm, the join order, and the join type of the selected policy.

10. The apparatus of claim 9, wherein the communications hardware is further configured to receive an execution results set, wherein the execution results set indicates results of an execution of the first query in accordance with the query execution plan; and wherein the apparatus further comprises intelligent agent circuitry configured to train the reinforcement learning engine using the execution results set.

11. The apparatus of claim 9, wherein the execution metric set further comprises an execution time metric.

12. The apparatus of claim 9, wherein the parameter set comprises one or more of hardware configuration data;

query load data;

table characteristic data; and query characteristic data.

13. The apparatus of claim 12, wherein the table characteristic data indicates one or more of a table size, complexity, cardinality, distribution, density, variability, and velocity of one or more tables indicated by the query.

14. The apparatus of claim 9, wherein the first-query comprises one or more join clauses.

15. The apparatus of claim 9, further comprising:

a transfer learning engine configured to generate, in response to determining that the query fully corresponds to a stored query of the historical query repository, a query execution plan for the query based at least on a previous query execution plan associated with the stored query.

16. The apparatus of claim 9, wherein the query analysis engine is further configured to, in response to determining that the query partially corresponds to a stored query of the historical query repository, determine the parameter set indicating the current state associated with the system involved in the execution of the query, wherein the communications hardware is further configured to receive a modified parameter set that is based on the parameter set, wherein the reinforcement learning engine is further configured to process the first query and the modified parameter set in accordance with at least a portion of the plurality of policies, wherein the reinforcement learning engine is further configured to select, based on the processing, a selected policy from the portion of the plurality of policies, and wherein the reinforcement learning engine is further configured to generate, based on the selected policy, a query execution plan for the query.

17. The method of claim 4, wherein the hardware configuration data indicates one or more of a computer processing unit speed, a computer processing unit clock speed, a number of computer processing unit cores, a computer processing unit type, a computer processing unit size, a computer processing unit read speed, a computer processing unit write speed, an amount of available random access memory, an available network bandwidth, a cache size, a graphics processing unit availability, and a graphics processing unit specification.

18. The method of claim 4, wherein the query load data indicates at least one of a number of queries in a queue, an amount of demand placed on the system, an estimated execution time for one or more queries of the queries in the queue, historical query performance data, a historical resource usage, a historical execution time, and a volume of queries being received or processed at a given time.

19. The apparatus of claim 12, wherein the hardware configuration data indicates one or more of a computer processing unit speed, a computer processing unit clock speed, a number of computer processing unit cores, a computer processing unit type, a computer processing unit size, a computer processing unit read speed, a computer processing unit write speed, an amount of available random access memory, an available network bandwidth, a cache size, a graphics processing unit availability, and a graphics processing unit specification.

20. The apparatus of claim 12, wherein the query load data indicates at least one of a number of queries in a queue, an amount of demand placed on the system, an estimated execution time for one or more queries of the queries in the queue, historical query performance data, a historical resource usage, a historical execution time, and a volume of queries being received or processed at a given time.

\* \* \* \* \*